J. TRAUM.
VULCANIZING EQUIPMENT FOR VULCANIZING CASINGS FOR PNEUMATIC TIRE TUBES.
APPLICATION FILED AUG. 9, 1920.
1,375,542.
Patented Apr. 19, 1921.
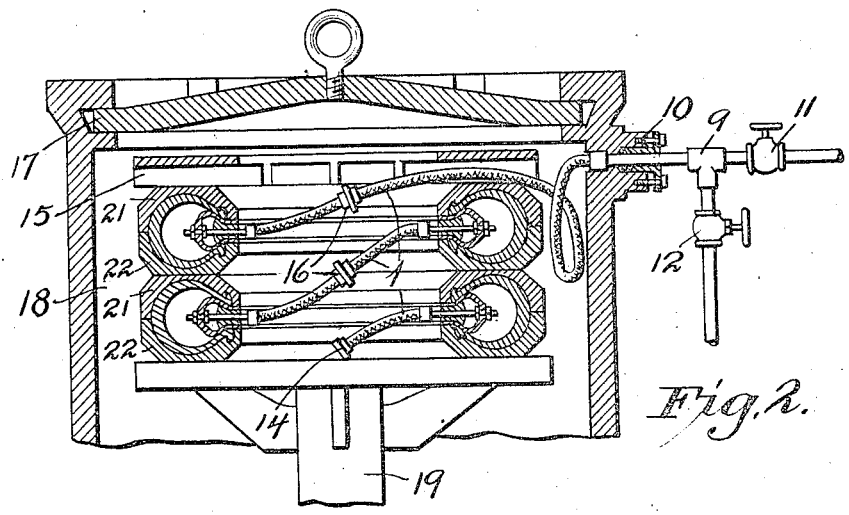
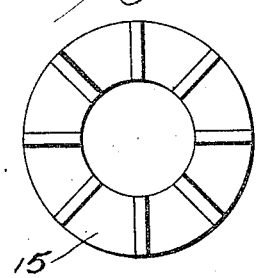
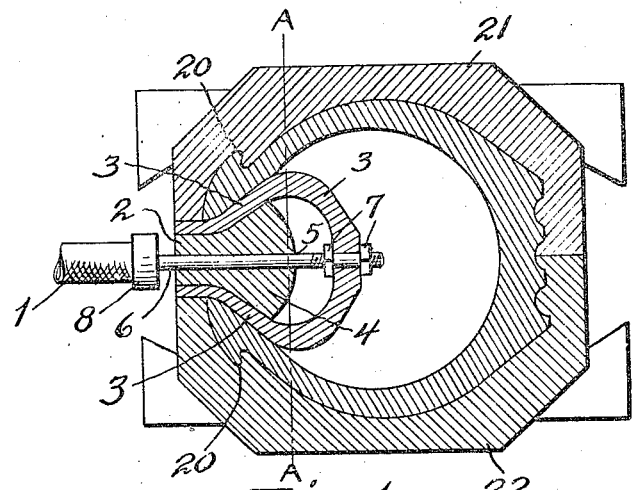
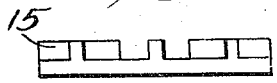
Inventor:
John Traum

UNITED STATES PATENT OFFICE.

JOHN TRAUM, OF COSHOCTON, OHIO.

VULCANIZING EQUIPMENT FOR VULCANIZING CASINGS FOR PNEUMATIC-TIRE TUBES.

1,375,542.

Specification of Letters Patent. Patented Apr. 19, 1921.

Application filed August 9, 1920. Serial No. 402,173.

*To all whom it may concern:*

Be it known that I, JOHN TRAUM, a citizen of the United States, and residing at Coshocton, in the county of Coshocton and State of Ohio, have invented new and useful Improvements in Vulcanizing Equipments for Vulcanizing Casings for Pneumatic-Tire Tubes, of which the following specification is an exact and true description, such as will enable others skilled in the art to which it appertains to make and use the same.

The invention relates to the vulcanization of casings that are used in combination with pneumatic tubes, the said combination being usually referred to as the pneumatic tire.

In the process of vulcanizing casings it has been demonstrated that better results are obtainable when the casing to be vulcanized is removed from the rigid core upon which it is constructed, and there is substituted an elastic core which by means of an expanding medium, such as air, or steam, is expanded to subject the casing in process of vulcanization to an internal pressure, or, by means of continuous metal rings that are placed within, and at the inner periphery of the casing, and upon which the beads of the casing are compressed, and that are apertured to admit the expanding medium, the expanding pressure is introduced directly to the inner surface of the casing.

My invention relates to improvements in these bead compressing continuous ring members, and to means of separably connecting an air, or other expanding medium system with a plurality of casings to be vulcanized that are within the casing forming mold parts, and means of introducing and controlling the expanding pressure within the plurality of casings after the top cover of the vulcanizing chamber is in operative position, and while the enveloping mold parts that conform to the casings, are being subjected to the pressure of the ram of the vulcanizer.

In the improved bead compressing, and pressure retaining member as disclosed in this specification, I have provided means to correct faulty results that obtain with present methods of employing bead compressing metal rings, that are caused by the abrupt change in the character of the pressure to which the side walls of the casing are subjected, and which is the result of the positive pressure of the metal rings upon which the beads are compressed leaving a sharply defined line at the circumference of the side walls where the metal rings meet the more resilient pressure of the expanding medium within the casing.

To correct this condition, I have, in my invention combined the desirable features of the inflatable core, with the desirable features of the metal ring abutment upon which the beads and the side walls at the inner periphery of the casing are compressed.

I have also provided means by which the pressure conducting members that are attached to the inflating stems carried by the pressure retaining, bead and side wall compressing members, may be separably connected one by one as the casings in which they are in operative position are placed within the vulcanizing chamber, and to be finally separably connected with a pressure conducting system hereinafter described, in which means are provided to control the expanding pressure within the plurality of casings in process of vulcanization by valves located in the pressure conducting system of piping on the out side of the vulcanizer.

With my invention in use, the internal pressure need not be applied to the casing until the vulcanizing temperature has acted upon the rubber compound, and the bead forming grooves in the enveloping mold parts have compressed and conformed to the bead stock of the casing. Thus, the principal cause of misplaced bead stock, and of mold bruised fabric is eliminated. The construction of the improved bead and side wall compressing member as described in this specification, is such, that while providing a sufficiently rigid abutment upon which to compress and conform the bead stock of the casing, there is a desirable resilient quality supplied by the rubberized fabric or cord casing, that is vulcanized to conform to the inwardly directed flange of the metal ring, the outer circumference of the said casing that encompasses the outer periphery of the metal ring being free to flex in response to the pressure conducted to its outer surface, and to subject the side walls of the casing in process of vulcanization to pressure that gradually diminishes outwardly to the circumference line where the vulcanized casing that is a part of the vulcanizing equipment separates from the side walls of the casing in process of vulcanization. Thus the objectional sudden transition from the firm abutment necessary for the proper compressing of the bead stock, to the more resilient expanding pressure within the casing, is eliminated.

With these objects in view, the invention consists in the easily installed parts that may be successfully used in combination with any type of vertical vulcanizer having an interior pressure ram, and the casing forming molds that envelop the casings to be vulcanized may be of any preferred construction, and the invention may be successfully used in the construction of the clencher or straight side type of casing; but as will be understood the casing cavity or the annular grooves in the companion mold parts that envelop the casing to be expanded and vulcanized are of such dimensions and conformation relative to the core upon which the casing has been constructed as will allow the fabric or cord structure of the casing to respond to the pressure within the casing.

Referring to the drawings forming a part of this specification, Figure 1 is a diametral section of the casing forming mold parts, and the improved pressure retaining, bead and side wall compressing member that is in operative position within the casing to be vulcanized is encompassed by the casing forming mold parts. Fig. 2, is a central vertical sectional view of the upper part of a vertical vulcanizer illustrating the method employed to introduce the pressure conducting system of piping to the inner side of the wall of the vulcanizing chamber, and the means employed to separately connect a plurality of the bead and side wall compressing members with the pressure conducting system of piping.

Fig. 3, is an edge, and Fig. 4, a bottom view of an annular metal member having radial ribs adapted to provide a passage for the flexible tubing between the under side of the top cover of the vulcanizing chamber and the last casing forming mold to be placed in position upon the ram of the vulcanizer.

Referring to Fig. 1, and to the continuous metal ring indicated by the numeral 4, the surface of the sides of the said metal ring near the outer periphery are adapted to conform to the inner surface of the side walls of the casing to be vulcanized; the function of the continuous metal ring is to provide a firm abutment for the side walls 3 of the rubberized fabric or cord annular vulcanized casing that is secured to the inwardly directed flange 2 of the continuous metal ring. The walls of the rubberized fabric or cord annular vulcanized casing at the rift in its inner periphery, are of the same conformation as the surface of the sides of the continuous metal ring upon which they are supported; the enlarged diameter of the said vulcanized casing that encompasses the outer periphery of the continuous metal ring conforms to the inner surface of the side walls of the casing to be vulcanized, and separates from its surface at the central circumference of the enlarged diameter of the vulcanized casing, as indicated by the broken line A A Fig. 1.

An aperture 5 radially directed in the continuous metal ring admits a pressure conducting stem 6 that is secured to, and apertures the wall of the rubberized fabric or cord annular vulcanized casing, as indicated by the numeral 7.

The vulcanized casing that is a part of the improved bead and side wall compressing member, is preferably built up of layers of rubberized fabric or cord, similar to that usually employed in the construction of casings for pneumatic tire tubes, and the side walls of the said vulcanized casing secured to the flange of the continuous metal ring by cement, or the flange may be provided with suitable sharpened projections on its surface near the inner periphery, that are adapted to penetrate the fabric or cord structure of the side walls of the vulcanized casing.

The improved vulcanizing equipment as I prefer to employ it, comprises in combination with the improved bead and side wall compressing (and as is understood, pressure retaining) members, a system of pressure conducting piping, and means to admit one end of a length of the piping to the inner side of the vulcanizing chamber, and to be separably connected with the last placed in position of a plurality of casings to be vulcanized, their connection being effected by means of pressure conducting flexible tubing and fittings adapted to establish their union; yet, it is obvious, that the pressure conducting system (that saves labor, and time consumed in bolting or clamping companion mold parts of casing forming molds against an expansive pressure that is applied to the inner surface of the casing prior to placing the mold, and the expanded casing, within the vulcanizing chamber, and, that allows the rubber compound to be acted upon by the vulcanizing temperature prior to subjecting the casing to the internal pressure) may be dispensed with, and the bead and side wall compressing member employed as in ordinary practice.

The pressure conducting system of piping consists simply in a length of piping that connects with accumulated pressure, one end of the piping being admitted to the inner side of the vulcanizing chamber by the stuffing box 10 installed in the wall of the vulcanizing chamber, the outer end of the said length of piping carrying a T fitting that secures lengths of piping which are fitted with valves 11 and 12. The downwardly directed length of piping with valve 12 open serving as a passage for released pressure when pressure admitting valve 11 is in closed position. Valve 12 is in closed position, and valve 11 in open position to admit pressure to the pressure conducting system within the vulcanizing chamber and to the casings in process of vulcanization.

The operation of the improved vulcanizing equipment is as follows: The casing to be vulcanized is removed from the core upon which it is constructed, and the annular bead and side wall compressing member is placed within the rift of the casing to be vulcanized. The resilient firmness of the flexible outer periphery of the vulcanized annular casing forming a part of the bead and side wall compressing member, will, with the coöperation of the curved inner surface of the casing to be vulcanized, readily aline within, and at the inner periphery of the casing to be vulcanized. The said casing to be vulcanized with the bead and side wall compressing member in operative position within the rift at the inner periphery of the said casing to be vulcanized, is placed within the casing forming mold parts, that are in turn placed in their proper vulcanizing position upon the interior pressure ram of the vulcanizer.

Referring to the inwardly directed pressure conducting stem 6 that is secured to, and apertures the wall of the vulcanized casing, as has been described, a similar pressure conducting stem, is, in the same manner, and by like means, secured to the wall of the vulcanized casing 3 at the opposite point in its outer circumference.

When placing a single mold that envelops a casing to be vulcanized, or the first of a plurality of molds, and casings, one of the two pressure conducting flexible members 1 carried by the bead and side wall compressing member within the casing to be vulcanized is capped by means of a pressure retaining fitting 14, a similar pressure conducting flexible tubing member carried by the same bead and side wall compressing member, is secured by a union effecting fitting to one of similar pressure conducting flexible tubing members, carried by the next to be placed similar bead and side wall compressing member. Thus in the second, and in all of a series of the bead and side wall compressing members that are to be placed in operative position, a pressure conducting flexible tubing member is provided to establish a separable connection with one of similar pressure conducting flexible tubing members carried by the inwardly directed stems of the bead and side wall compressing member that is next to be placed, and to be finally separably connected to the pressure conducting system of piping that is admitted to the inner side of the vulcanizing chamber, and that terminates in a pressure conducting flexible tubing member the free end of which carries a fitting 16 adapted to establish their separable union.

With the desired number of casings to be vulcanized in proper vulcanizing position upon the pressure ram of the vulcanizer, and the top cover 17 of the vulcanizing chamber 18 in operative relation with the pressure ram 19 and the casing forming molds between, the expanding pressure need not be, and is preferably not, applied to the inner surface of the casings in process of vulcanization until the vulcanizing temperature has acted upon the rubber compound, and the side walls of the casings carrying the bead stock, have been conformed by the compressing force of the pressure ram of the vulcanizer, and the bead stock has established a firm union with the bead conforming annular grooves 20, in the casing forming mold parts 21, 22. By the proper manipulation of the valves, 11 and 12, the expanding pressure may be admitted and released at the will of the operator in charge of the vulcanizer.

The vulcanized casings and the casing forming mold parts are removed one by one from the top opening of the vulcanizing chamber, as in ordinary practice, excepting that the pressure conducting flexible tubing members that are attached to the improved bead and side wall compressing members, are separated, one from another, as the casing forming mold parts are removed.

Attention is particularly directed to the construction of the rubberized fabric or cord annular vulcanized casing that is a part of the vulcanizing equipment. The enlarged diameter that is presented to, and retains the expanding pressure that is conducted to its outer surface, and to within the casing in process of vulcanization, will, in response to the expanding pressure within the casing, flex, and subject the side walls of the casing in process of vulcanization, to the reactive pressure that is concentrated at their connecting surfaces. By the means just described there is secured superior results, and the duration of the usefulness of the vulcanized casing that is a part of the vulcanizing equipment is greatly prolonged over any rubberized fabric member intended for such use with which I am acquainted.

I claim as my invention:—

1. In vulcanizing equipment to be used in connection with a vertical vulcanizer having an interior pressure ram, and that is adapted to vulcanize casings for pneumatic tire tubes, the combination of a continuous metal ring, the conformation of its sides near the outer periphery conforming to the inner surface near the inner periphery of the casing to be vulcanized, an inwardly directed flange carried by and forming the inner periphery of the continuous metal ring, and a rubberized fabric or cord annular casing vulcanized to conform to the sides of the said inwardly directed flange and to encompasses the outer periphery of the continuous metal ring so as to leave space between the inner surface of the said vulcanized casing and the surface of the outer periphery of the said continuous metal ring.

2. In vulcanizing equipment to be used in connection with a vertical vulcanizer having an interior pressure ram, and that is adapted to vulcanize casings for pneumatic tire tubes, the combination of inwardly directed pressure conducting stems secured to the vulcanized wall of a rubberized fabric or cord annular casing at opposite points on the outer periphery of the said vulcanized casing, the said stems being adapted to aperture the wall of the said vulcanized casing and to extend through openings radially directed in a continuous metal ring that carries and the outer circumference of which is encompassed by the vulcanized casing so as to leave space between the inner surface of the said vulcanized casing and the surface of the outer periphery of the said continuous metal ring.

3. In vulcanizing equipment to be used in connection with a vertical vulcanizer having an interior pressure ram, and that is adapted to vulcanize casings for pneumatic tire tubes, the combination of a continuous metal ring that carries and the outer circumference of which is encompassed by a rubberized fabric or cord annular vulcanized casing so as to leave space between the inner surface of the said vulcanized casing and the surface of the outer periphery of the said continuous metal ring, radial apertures at opposite points in the said continuous metal ring in which pressure conducting stems that are secured to and aperture the wall of the said vulcanized casing have free radial movement, the inner ends of the said pressure conducting stems terminating in fittings that secure lengths of pressure conducting flexible tubing, to the free ends of which are secured union effecting fittings adapted to connect with union effecting companion fittings carried by the free ends of pressure conducting flexible tubing secured to similar members occupying operative position within casings that are to be placed in position to be vulcanized, and to finally establish a pressure conducting union with the last placed in position of a plurality of casings that are to be expanded and vulcanized, and a pressure conducting system of piping that terminates in a union effecting fitting carried by a similar pressure conducting flexible tubing member within the vulcanizing chamber.

4. In vulcanizing equipment to be used in connection with a vertical vulcanizer having an interior pressure ram, and that is adapted to vulcanize casings for pneumatic tire tubes, the combination of a rubberized fabric or cord annular vulcanized casing, inwardly directed pressure conducting stems secured to and aperturing the wall of the said vulcanized casing at opposite points in its outer circumference, a continuous metal ring that carries and the outer circumference of which is encompassed by the said vulcanized casing so as to leave space between the inner surface of the said vulcanized casing and the surface of the outer periphery of the said continuous metal ring, radially directed apertures in the said continuous metal ring at opposite points that are adapted to receive the said inwardly directed pressure conducting stems, the said continuous metal ring being adapted to provide a substantial and rigid abutment for the side walls of the said vulcanized casing, which in turn provide a resilient abutment upon which the beads of the casing in process of vulcanization are compressed by the closing action of the casing forming mold parts, the outer circumference of the said vulcanized casing being free to flex in response to the expanding pressure within the casing in process of vulcanization and to subject the side walls of the said casing in process of vulcanization to pressure that gradually diminishes outwardly to the circumference where the vulcanized surface of the casing that is a part of the vulcanizing equipment separates from the surface of the side walls of the casing in process of vulcanization.

In testimony whereof I affix my signature.

JOHN TRAUM.

Witnesses:
  Mrs. J. G. Reamer,
  J. G. Reamer.